(12) United States Patent
Ohk

(10) Patent No.: US 9,094,556 B2
(45) Date of Patent: Jul. 28, 2015

(54) IMAGE FORMING APPARATUS, METHOD FOR PROCESSING IMAGE THEREOF AND NON-TRANSITORY COMPUTER-READABLE RECORDING MEDIUM

(71) Applicant: Samsung Electronics Co., Ltd., Suwon-si (KR)

(72) Inventor: Hyung-soo Ohk, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/306,461

(22) Filed: Jun. 17, 2014

(65) Prior Publication Data
US 2015/0062666 A1    Mar. 5, 2015

(30) Foreign Application Priority Data
Sep. 5, 2013    (KR) .......................... 10-2013-0106436

(51) Int. Cl.
*H04N 1/04* (2006.01)
*H04N 1/00* (2006.01)

(52) U.S. Cl.
CPC ................................ *H04N 1/00803* (2013.01)

(58) Field of Classification Search
CPC . H04N 1/387; H04N 1/46; H04N 2201/3242; H04N 13/0203; H04N 13/0239; H04N 13/025; H04N 13/0253; H04N 13/0271; H04N 1/00005; H04N 1/00015; H04N 1/00031
See application file for complete search history.

(56) References Cited

U.S. PATENT DOCUMENTS

| | | | | |
|---|---|---|---|---|
| 5,280,367 A * | 1/1994 | Zuniga | ......................... | 358/462 |
| 6,118,895 A * | 9/2000 | Hirota et al. | .................. | 382/165 |
| 6,212,299 B1 * | 4/2001 | Yuge | ............................. | 382/231 |
| 6,257,693 B1 * | 7/2001 | Miller et al. | .................... | 347/19 |
| 6,483,609 B1 * | 11/2002 | Ueno et al. | ..................... | 358/434 |
| 6,628,833 B1 * | 9/2003 | Horie | ............................ | 382/173 |
| 8,085,416 B2 | 12/2011 | Salgado et al. | | |
| 8,179,556 B2 | 5/2012 | Salgado et al. | | |
| 8,194,685 B2 * | 6/2012 | Killian | .......................... | 370/401 |
| 8,223,402 B2 * | 7/2012 | Yao | .............................. | 358/3.06 |
| 8,340,396 B2 * | 12/2012 | Yao | ................................ | 382/149 |
| 8,406,570 B2 * | 3/2013 | Morimoto et al. | ............ | 382/296 |
| 8,780,407 B2 * | 7/2014 | Morimoto et al. | ............. | 358/1.9 |
| 2012/0050828 A1 | 3/2012 | Ohk | | |
| 2013/0259363 A1 * | 10/2013 | Ozawa et al. | ................. | 382/164 |
| 2014/0029074 A1 * | 1/2014 | Tanaka | .......................... | 358/518 |
| 2014/0268260 A1 * | 9/2014 | Kitai et al. | ..................... | 358/521 |
| 2014/0293299 A1 * | 10/2014 | Ozawa | ........................... | 358/1.9 |

FOREIGN PATENT DOCUMENTS

| | | |
|---|---|---|
| JP | 08-328788 | 12/1996 |
| JP | 2003-219189 | 7/2003 |
| JP | 2007-067461 | 3/2007 |
| KR | 10-2012-0019641 | 3/2012 |

* cited by examiner

*Primary Examiner* — Negussie Worku
(74) *Attorney, Agent, or Firm* — Staas & Halsey LLP

(57) ABSTRACT

An image processing method includes scanning a document, separating a text region from the scanned document and detecting symbols included in the text region, calculating feature values of the detected symbols, selecting a representative value from the calculated feature values, and converting the symbols having the feature values other than the representative value into a preset color or form.

15 Claims, 9 Drawing Sheets

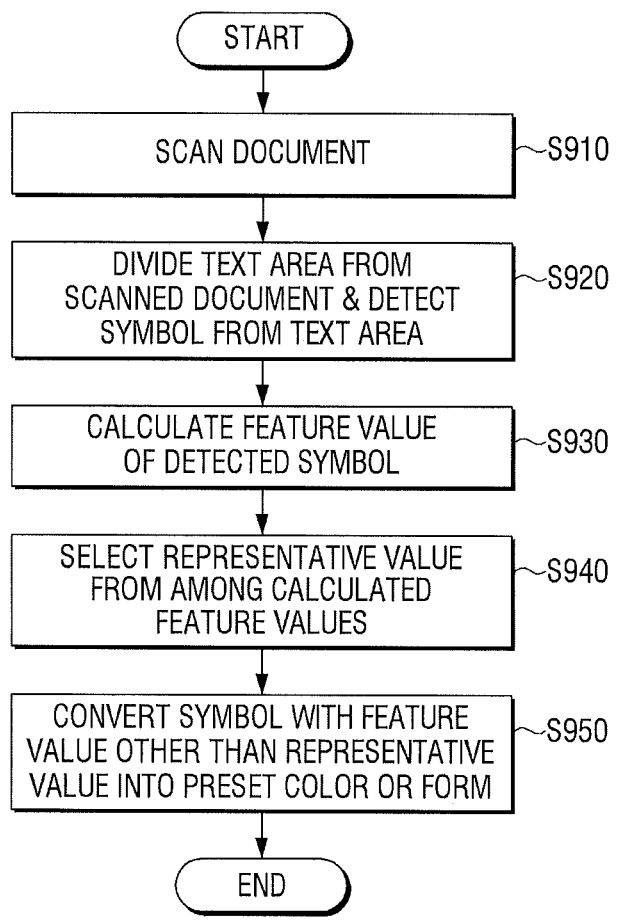

IMAGE FORMING APPARATUS, METHOD FOR PROCESSING IMAGE THEREOF AND NON-TRANSITORY COMPUTER-READABLE RECORDING MEDIUM

CROSS-REFERENCE TO RELATED APPLICATIONS

This application claims the priority benefit from Korean Patent Application No. 10-2013-0106436, filed on Sep. 5, 2013, in the Korean Intellectual Property Office, the disclosure of which is incorporated herein by reference in its entirety.

BACKGROUND

1. Field

Embodiments relate to an image forming and processing, and more particularly, to an image forming apparatus and an image processing method for automatically re-generating chromatic data which is lost when a chromatic document is converted into monochromatic (i.e., black-white-white) one, and outputting the re-generated chromatic data without requiring user's additional intervention.

2. Description of the Related Art

An image forming apparatus such as a printer, a scanner, a copier, a facsimile or a multifunction unit integrating the above functions, refers to an apparatus that operates to generate, print, receive or transmit image data.

A general image forming apparatus has a monochromatic mode in which a document to be outputted is outputted as monochromatic (i.e., black-and-white) data, a chromatic mode in which the chromatic data of the document to be outputted is outputted as it is, and an automatic mode in which the document to be outputted is selectively outputted between monochromatic and chromatic modes depending on the degree the chromatic pixels occupying the document.

In order to save maintenance cost of a color toner, most users output a document including a mixture of non-chromatic and chromatic data in the monochromatic mode. It is thus possible to reduce use of color toners, by outputting even the chromatic data of the document as monochromatic data.

However, a problem arises when the document containing chromatic text is outputted in the monochromatic mode. That is, information about key words or phrases that a user has written in different colors can be lost.

Accordingly, an image forming apparatus is necessary, which can re-generate information highlighted by a user, by automatically recovering the chromatic data that was originally contained in the document including color text but lost in the process of converting into monochromatic data, without requiring user's additional intervention.

SUMMARY

One or more embodiments overcome the above disadvantages and other disadvantages not described above. However, each embodiment is not required to overcome the disadvantages described problems described above.

One or more embodiments solve the problems as described above. However, each embodiment is not required to solve the problems as described above. One or more embodiments may provide an image forming apparatus and an image processing method for automatically re-generating chromatic data which is lost when a document including color text is converted into monochromatic (i.e., black-and-white) one, and outputting the re-generated chromatic data.

In an aspect of one or more embodiments, there is provided an image processing method, which may include scanning a document, separating a text region from the scanned document and detecting symbols included in the text region, calculating feature values of the detected symbols, selecting a representative value from the calculated feature values, and converting the symbols having the feature values other than the representative value into a preset color or form.

The document may be a document including color text therein, which undergoes a process of conversion into monochromatic data before being outputted, during which the document loses information about the color text.

The converting may include converting the symbols into a preset color or form that corresponds to the feature values of the symbols.

The selecting may include selecting the feature values of a majority of the symbols as the representative value.

The calculating may include calculating the feature values about at least one of brightness, size, and thickness of the symbols.

The converting may include converting at least one of thickness, font and size of the symbols having the feature values other than the representative value.

The image processing method may additionally include receiving an input of target color or form for conversion, according to the feature values of the symbols.

The image processing method may additionally include outputting a document that includes the symbols in a form converted into the preset color or form.

In an aspect of one or more embodiments, there is provided an image forming apparatus, which may include a scanner configured to scan a document, a detector configured to separate a text region from the scanned document and detect symbols included in the text region, a calculator configured to calculate feature values of the detected symbols, and a controller configured to select a representative value from the calculated feature values, and convert the symbols having the feature values other than the representative value into a preset color or form.

The document may be a document including color text therein, which undergoes a process of conversion into monochromatic data before being outputted, during which the document loses information about the color text.

The controller may convert the symbols into a preset color or form that corresponds to the feature values of the symbols.

The controller may select the feature values of a majority of the symbols as the representative value.

The calculator may calculate the feature values about at least one of brightness, size, and thickness of the symbols.

The controller may convert at least one of thickness, font and size of the symbols having the feature values other than the representative value.

The image forming apparatus may additionally include a user interface configured to receive an input of target color or form for conversion, according to the feature values of the symbols.

The image forming apparatus may additionally include an image former configured to output a document that includes the symbols in a form converted into the preset color or form.

In an aspect of one or more embodiments, there is provided a computer readable medium, which may comprise a program to implement an image processing method including scanning a document, separating a text region from the scanned document and detecting symbols included in the text region, calculating feature values of the detected symbols, selecting a representative value from the calculated feature values, and converting the symbols having the feature values other than the representative value into a preset color or form.

According an aspect of one or more embodiments, although a document containing color text loses color text in the process of conversion into monochromatic document to be outputted, by re-generating the lost color data and outputting the same, it is possible to recover the color data about a specific word or phrase as set by a user, without requiring user's additional intervention.

In an aspect of one or more embodiments, there is provided an image forming apparatus, which may include a scanner configured to scan a document, a detector configured to detect symbols included in a text region of the scanned document, a calculator configured to calculate feature values of the detected symbols, and a controller configured to select a representative value from the calculated feature values, and convert the symbols having the feature values other than the representative value into a preset color or form.

In an aspect of one or more embodiments, there is provided an image forming method which may include scanning a document, detecting symbols included in a text region from the scanned document, calculating feature values of the detected symbols, selecting a representative value from the calculated feature values, and converting the symbols having the feature values other than the representative value into a preset color or form.

According to an aspect of one or more embodiments, there is provided at least one non-transitory computer readable medium storing computer readable instructions to implement methods of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and/or other aspects will be more apparent by describing exemplary embodiments with reference to the accompanying drawings, in which:

FIG. 9 is a flowchart provided to explain an image processing method according to an embodiment.

DETAILED DESCRIPTION

Figure 1:
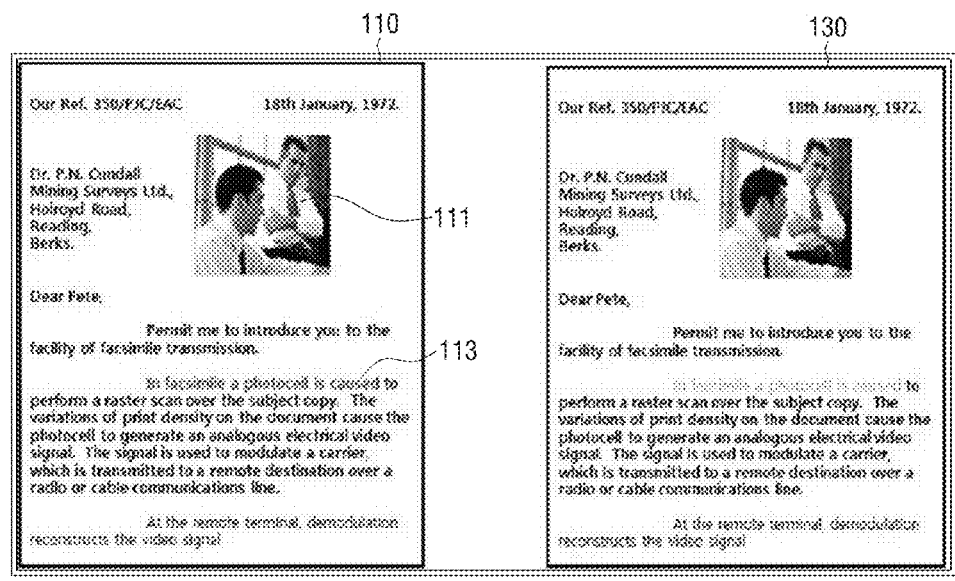
FIG. 1 illustrates a result of converting a document including color text into monochromatic document and outputting the same.

Reference will now be made in detail to embodiments, examples of which are illustrated in the accompanying drawings, wherein like reference numerals refer to the like elements throughout.

In the following description, same drawing reference numerals are used for the same elements even in different drawings. The matters defined in the description, such as detailed construction and elements, are provided to assist in a comprehensive understanding of the present disclosure. Accordingly, it is apparent that exemplary embodiments of the present disclosure can be carried out without those specifically defined matters. Also, well-known functions or constructions are not described in detail since they would obscure the present disclosure with unnecessary detail.

FIG. 1 illustrates a result of converting a document including color text into monochromatic one and outputting the same.

A document 110 including chromatic text may include not only color photos 111, but also color texts 113 which are set to different colors according to degrees of importance as determined by a user. However, when the user outputs the document 110 including color texts in monochromatic mode at the printer or copies the document in monochromatic mode at the copier, the document is outputted in the form 130 as illustrated in right-hand side of FIG. 1.

Conventionally, the color photos 111 and the color texts 113 are converted into monochromatic data and outputted. The color texts 113 may be outputted with different brightness than the other texts which are originally black-and-white texts.

However, partial difference in brightness alone cannot express the highlighting information carried by the original color texts 113.

Accordingly, it is necessary to recover the lost chromatic data, particularly when the monochromatic data converted from the color text 113 is scanned for the purpose of another printing or copying.

Figure 2:
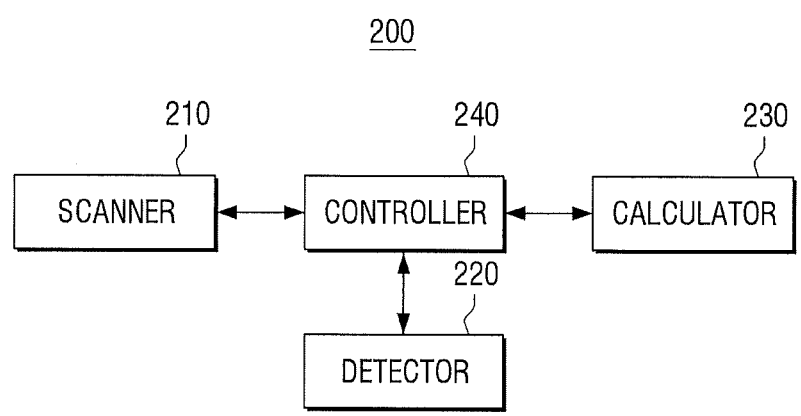
FIG. 2 is a block diagram provided to explain an image forming apparatus according to an embodiment.

FIG. 2 is a block diagram provided to explain an image forming apparatus according to an embodiment.

Referring to FIG. 2, the image forming apparatus 200 may include a scanner 210, a detector 220, a calculator 230 and a controller 240. FIG. 2 rather schematically illustrates the image forming apparatus 200 to emphasize only the related elements according to an embodiment. Accordingly, those skilled in the art will be able to understand that other universal elements may be added to those illustrated in FIG. 2.

The scanner 210 scans a document. The scanner 210 may digitize the scanned document using a CCD/CIS module, or the like.

The scanned document may include a mixture of image regions and text regions, in which the image regions may include graphics or photographs. Further, the document scanned at the scanner 210 may be an image having a plurality of pixels, and may include at least one text region and at least one image region therein.

The scanned document may be the kind of document from which chromatic text information originally included in the document is lost in the process in which the document is converted into monochromatic data and outputted.

Accordingly, even when the user highlights a specific phrase or word by writing the text in different color or applying specific shades in the process of writing the document, the data is converted into monochromatic data, thus losing chromatic features thereof, before the document is outputted.

The detector 220 separates the text region from the scanned document and detects respective symbols included in the text region.

The text region, image region and background region included in the scanned document may be separated by a segmentation manner. That is, the detector 220 may analyze the image inputted from the scanner 210, to determine the text, the image or the background that the traits of the respective pixels are closer to. All the pixels of the incoming image may thus be allocated with one of the traits of the text, image and background.

The detector 220 may detect the text region and the image region included in the scanned document using YCbCr color space, in which case it is possible to use the edge information that indicates difference in the brightness values between the pixel of interest and the other calculable neighborhood pixels using Y channel. That is, the detector 220 may use the brightness information (Y channel), color information (CbCr channel), or edge information of the corresponding pixels of the scanned document, and may consider information of the surrounding pixels as well as the corresponding pixels.

Further, the detector 220 may extract individual symbols from the separated text region. The expression 'symbol' as used herein may refer to object such as character, number or symbol with a specific connotation.

That is, after binarization with respect to the text region, the detector 220 may extract independent symbol using 8-neighborhood connected component. The result of symbol extraction may be any one of independent character, number or symbol, or alternatively, part of the respective characters may be extracted (e.g., "•" and "I" may be independently extracted from "i").

The calculator 230 may calculate feature values of the detected symbols. The calculator 230 may calculate the feature values of at least one of brightness, size and thickness of the symbols.

As explained above, when the color texts are converted into black-and-white and outputted, the converted color texts may be outputted in different brightness, size or thickness from those of the originally black-and-white texts.

Accordingly, the calculator 230 may calculate feature values of the respective symbols to determine the symbols in the color texts before conversion into monochromatic data. The feature values may relate to at least one of the brightness, size and thickness of the respective symbols.

The controller 240 may select a representative value among the calculated feature values and convert the symbols with feature values other than the representative value into a preset color or form.

An embodiment will be explained hereinbelow, with reference to an example where the feature value relates to the brightness of the respective symbols.

Since most symbols included in the text region are written in black, calculating the symbols based on the brightness as the feature value will mostly give the brightness value that corresponds to black. However, since the user writes a specific phrase or word that he wishes to emphasize in a specific color, only a few symbols are calculated to have different brightness values from black, when outputted as monochromatic data.

The controller 240 may calculate the representative value based on the feature values of the majority of symbols, and based on assumption that the symbols with the representative value are those that are originally written black-and-white and that the symbols with feature values other than the representative value are those that were originally color texts but lost the chromatic data in the process of conversion and outputting, the controller 240 may convert the latter symbols into a preset color or form.

The controller 240 may also convert the symbols with the feature values other than the representative value into preset colors that correspond to the feature values of the respective symbols. For example, when the symbol is calculated to have brightness A, the controller 240 may convert the symbol into a color such as blue that corresponds to brightness A, or when the symbol is calculated to have brightness B, the symbol may be calculated into corresponding color such as red.

In an embodiment, only the symbols having feature values other than the representative value may be converted into preset colors, but not limited thereto. Accordingly, it is possible to also convert the thickness or font of the symbols, or add underline to the symbols, to thus reproduce the highlighting information that was originally given.

Further, the image forming apparatus 200 according to an embodiment may additionally include a user interface (not illustrated) to receive color or form information to convert to according to the brightness value of the symbol.

For example, the user interface may receive a selection of specific color such as red or blue to convert the symbol with brightness value A, or may also receive information about thickness, font, or presence of underline for the symbol to be converted.

In an embodiment, the representative value may be calculated based on the brightness value of the symbol as the feature value, and the symbols having feature values other than the representative value may be converted into different color or form, but not limited thereto. Accordingly, the feature value may use other information, such as thickness or size of the symbol.

Further, the image forming apparatus 200 may additionally include an image former (not illustrated), and may output a document including symbols therein which are converted into preset colors or forms.

In an embodiment, the symbols having different feature values than the representative value may be converted into a preset color or form, only after the process of separating a text region from the scanned image.

Figure 3:
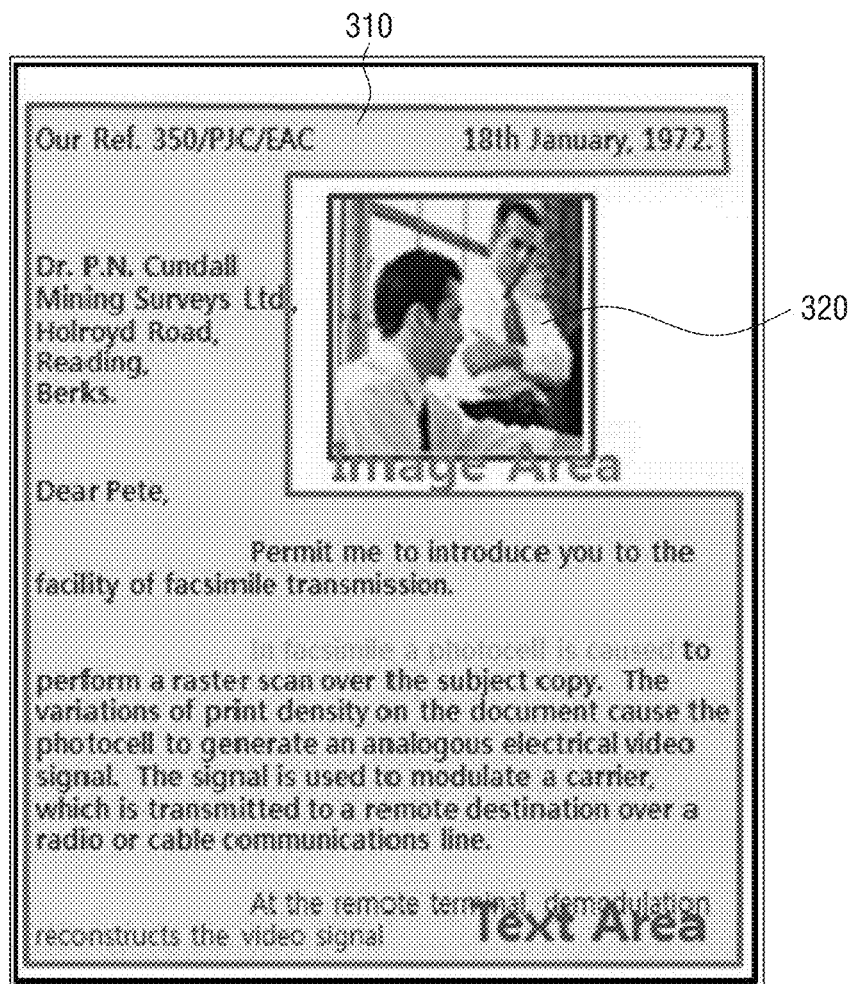
FIG. 3 is a view provided to explain a process of separating a text region and an image region from each other, according to an embodiment.

FIG. 3 is a view provided to explain a process of separating a text region and an image region from each other, according to an embodiment.

Referring to FIG. 3, the scanned document may include a text region 310 and an image region 320. As illustrated in FIG. 3, the scanned document may include a single text region, but not limited thereto. Accordingly, the scanned document may include a plurality of text regions or also a plurality of image regions.

The detector 220 may identify the scanned document into the text region 310 and the image region 320, and for this purpose, may employ a method of utilizing variation in the brightness values of the pixels of the scanned document, a method of dividing into blocks and categorizing the regions using the features within the respective blocks, a method of using edgeness, or others.

The entire pixels of the scanned document may e divided into image region, text region, and background region, or alternatively, since the text region and the background regions may be treated as identical region, the pixels of the scanned document may be divided into text and background region and image region.

Accordingly, when the scanned image is divided into the text region 310 and the image region 320, the symbols included in the text region 310 are detected.

Figure 4:
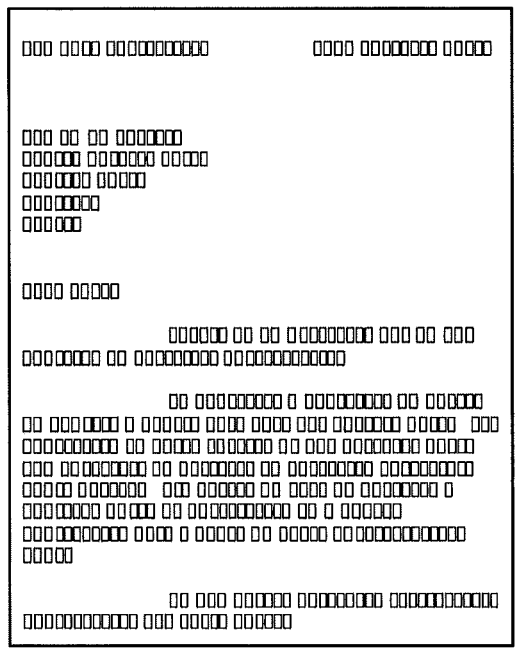
FIG. 4 is a view provided to explain a method for extracting a symbol contained in the text region, according to an embodiment.

FIG. 4 is a view provided to explain a method for extracting a symbol contained in the text region, according to an embodiment.

The symbols included in the text area 310 may be objects such as character, number or symbol with a specific connotation. The empty boxes illustrated in FIG. 4 represent the locations of the extracted symbols.

To be specific, the detector 220 separates the text region from the scanned image, performs binarization with respect to the text region, and extracts independent symbols using the 8-neighborhood connected component. The results of the extraction may be one independent, associated character (A, B, C, D, E, . . . ), or even a part of the character (i.e., "•" and "I" may be independently extracted from "i").

When the detector 220 separates the text region and detects the symbols, the calculator 230 calculates feature value of the detected symbols.

Figure 5:
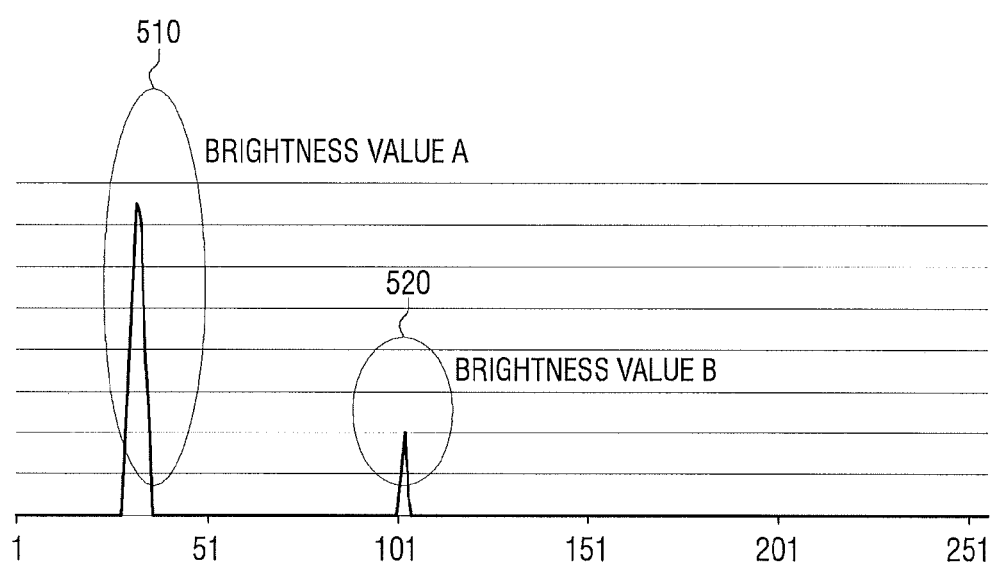
FIG. 5 is a view provided to explain a process of calculating feature values of the symbol and selecting a representative value from among the same, according to an embodiment.

FIG. 5 is a view provided to explain a process of calculating feature values of the symbol and selecting a representative value from among the same, according to an embodiment.

For the feature value of the symbols, the brightness, size or thickness may be used. However, for convenience of explanation, an embodiment where the brightness is used as the feature value will be explained below.

Referring to FIG. 5, the horizontal axis represents index of brightness value, while the vertical axis represents the number of objects of the symbols with brightness value.

When a color text is converted into monochromatic one and outputted, the chromatic data is lost. However, the above does not indicate that the outputted data carries the identical brightness as the original monochromatic text. In other words, the outputted data carries brightness values which are different from the monochromatic text, according to the original colors of the chromatic text.

The calculator 230 can calculate the feature values by measuring the brightness values of the symbols. As a result of the calculation, the feature values including a first brightness value 510 and a second brightness value 520 may be calculated, as illustrated in FIG. 5.

Because texts are written generally in black, while the words or phrases that a user wishes to emphasize are written in a specific color, most symbols included in the text region have the brightness value that corresponds to black.

Referring to FIG. 5, because there are more number of symbols having the first brightness value than the symbols with the second brightness value, the feature value having the first brightness value may be selected as the representative value. That is, based on the assumption that the symbols with the first brightness value as the feature value are those that are written in black, it may be assumed that the symbols having the second brightness value as the feature value are those that lost the chromatic data in the process of conversion of the document into monochromatic data and outputted.

The controller 240 may re-generate the original chromatic data by converting the second brightness value 520, which lost chromatic data in the process of converting an originally-chromatic text into monochromatic data and outputting, into a preset color or form.

Referring to FIG. 5, an embodiment in which the symbol having the feature values including the first and second brightness values is included in the document. However, depending on embodiments, symbols having three or more brightness values may be included.

In an embodiment, the respective symbols may be converted into preset colors corresponding to the feature values of the symbols and outputted. Further, in an embodiment, the image forming apparatus 200 may additionally include a user interface to set a target color for conversion according to the calculated thickness value.

Figure 6:
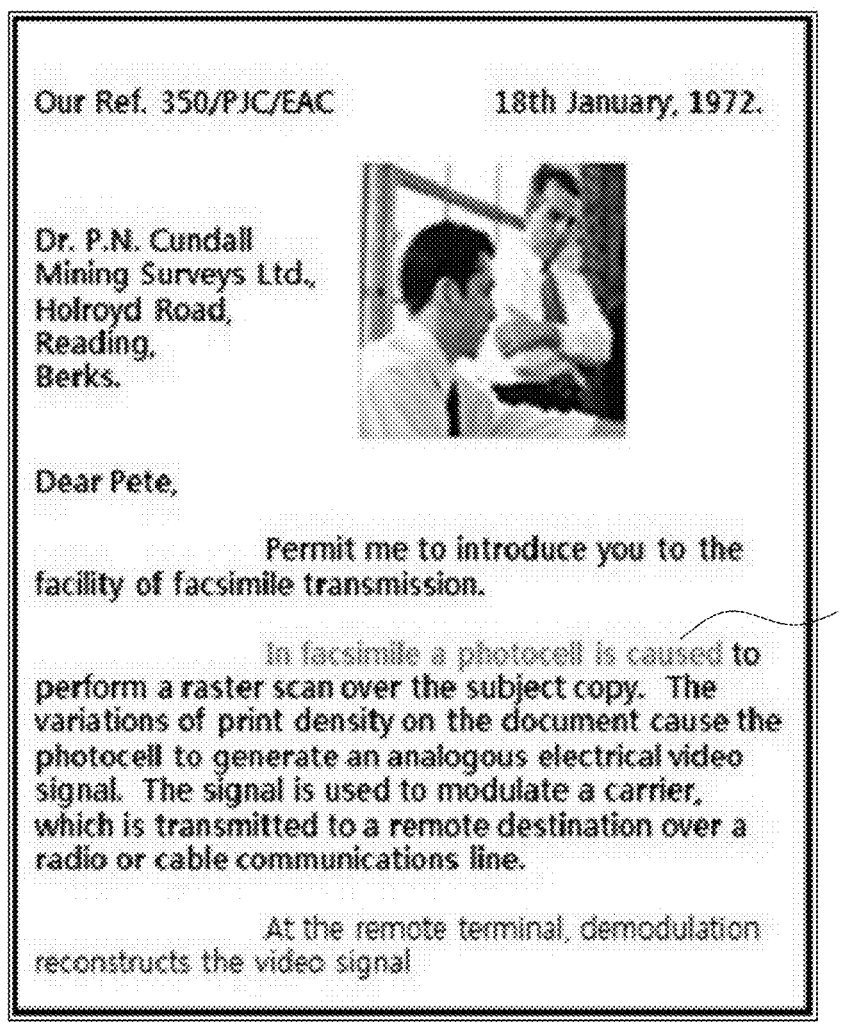
FIG. 6 is a view provided to explain a document with re-generated chromatic data according to an embodiment.

FIG. 6 is a view provided to explain a document with re-generated chromatic data according to an embodiment.

Referring to FIG. 5, the feature values other than the representative value, i.e., the symbols with the second brightness value 520 may be converted into a preset color by the controller 240 and outputted. Referring to FIG. 6, the symbol with the second brightness value 520 may be converted into green color, but not limited thereto. Accordingly, depending on implementation of an embodiment, the target colors corresponding to the respective brightness values may be preset so that the symbols may be converted into the corresponding colors, accordingly.

Referring also to FIG. 6, only one region 610 may be re-generated as the chromatic region. However, embodiments are not limited thereto. Accordingly, depending on embodiments, a plurality of text regions included into a document may be re-generated into different colors, respectively.

Figure 7:
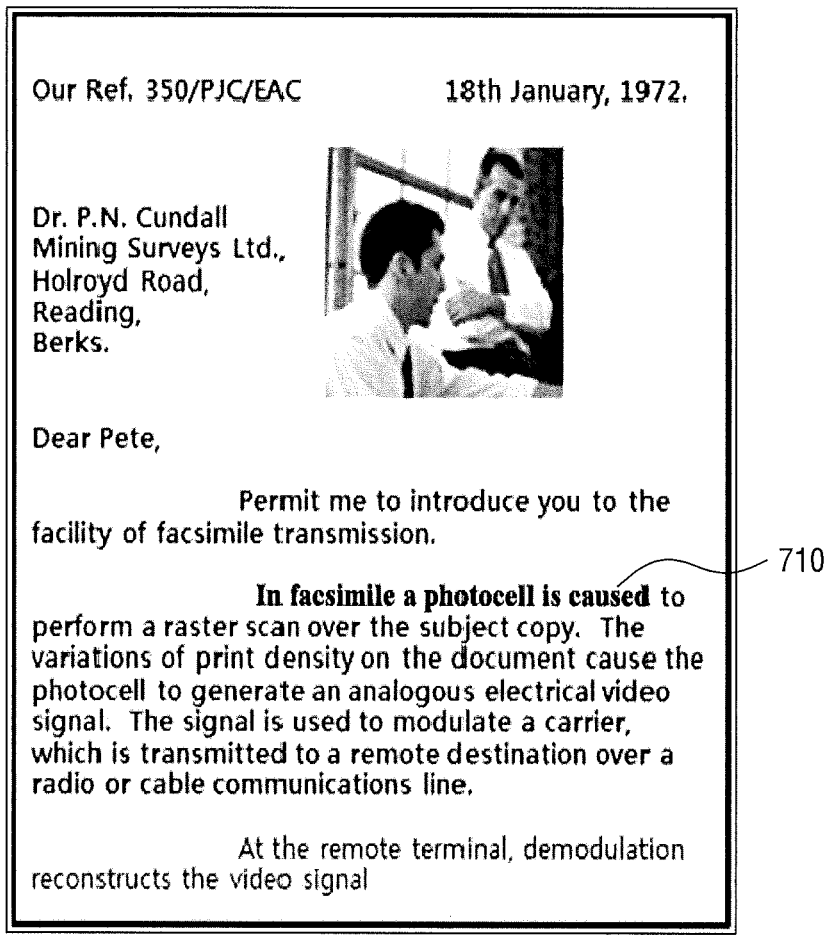
FIGS. 7 and 8 are views provided to explain a resultant document outputted after the text with lost chromatic data is converted into a preset form, according to an embodiment.
Figure 8:
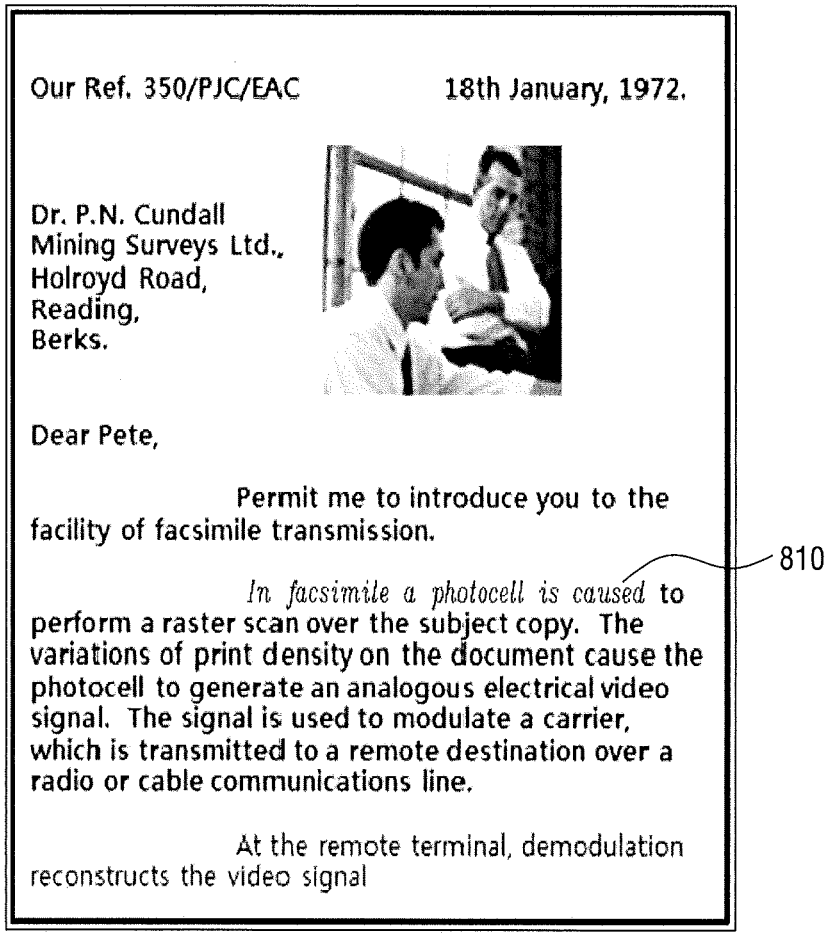

FIGS. 7 and 8 are views provided to explain a resultant document outputted after the text with lost chromatic data is converted into a preset form, according to an embodiment.

To re-generate the text which lost chromatic data, it is possible to convert the symbols with the feature values other than the representative value into a preset form and output the same, instead of re-generating the chromatic data by converting symbols into a preset color.

The 'preset form' as used herein may refer to font change or thickness change, or underlining.

FIG. 7 is a view provided to explain an example where the symbol of lost chromatic data is converted into boldfaced font as denoted by reference numeral 710, and FIG. 8 is a view provided to explain an example where the symbol of lost chromatic data is converted into italic font as denoted by reference numeral 810.

In an embodiment, the thickness or font of the symbol may be converted, but not limited thereto. Accordingly, depending on embodiments, it is possible to convert the form of the symbol using another way as far as it can increase user's recognition.

FIG. 9 is a flowchart provided to explain an image processing method according to an embodiment.

At S910, a scanner provided in an image forming apparatus scans a document. The scanned document may be the one that lost information about color text while the color text-containing document is converted into monochromatic data to be outputted.

At S920, when the document is scanned, text region is separated from the scanned document and the symbols included in the text region are detected, and at S930, feature values of the respective detected symbols are calculated. The feature values may be calculated using information such as brightness, size or thickness of the symbols.

At S940, a representative value of the calculated feature values is selected. The feature value of the majority of symbols may be selected as the representative value. At S950, the symbols having feature values other than the representative value are converted into a preset color or form.

One or more methods explained above may be written as a program to be executed on a computer, and implemented on a universal digital computer that implements the program by using a non transitory computer-readable recording medium. Data for use with the method explained above may be so constructed as to be written on a non-transitory computer-readable recording medium in a variety of ways.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

The foregoing exemplary embodiments and advantages are merely exemplary and are not to be construed as limiting the present disclosure. The present disclosure can be readily applied to other types of apparatuses. Also, the description of exemplary embodiments of the present disclosure is intended to be illustrative, not to limit the scope of the claims, and many alternatives, modifications, and variations will be apparent to those skilled in the art.

While exemplary embodiments have been described with reference to the figures, it will be understood by those of ordinary skill in the art that various changes in form and details may be made therein without departing from the spirit and scope of the present disclosure as defined by the following claims and their equivalents.

What is claimed is:

1. An image processing method implemented on an image forming apparatus, the method executed by at least one processor mounted on the image forming apparatus, the method comprising:
   scanning a document;
   separating a text region from the scanned document;
   extracting symbols transcribed in the text region, the symbol is one of independent character, number or symbol, or part of the respective characters;
   calculating feature values of at least one of brightness, size and thickness of the extracted symbols;
   selecting a representative value from the calculated feature values; and
   converting a color or visual form of the extracted symbols having the feature values other than the representative value into a preset color or form.

2. The image processing method of claim 1, wherein the document is a document including color text therein, which undergoes a process of conversion into monochromatic data before being outputted, during which the document loses information about the color text.

3. The image processing method of claim 1, wherein the converting comprises converting the color or visual form of the symbols into the preset color or form that corresponds to the feature values of the symbols.

4. The image processing method of claim 1, wherein the selecting comprises selecting the feature values of a majority of the symbols as the representative value.

5. The image processing method of claim 1, wherein the converting comprises converting at least one of thickness, font and size of the symbols having the feature values other than the representative value.

6. The image processing method of claim 1, further comprising receiving an input of target color or form for conversion, according to the feature values of the symbols.

7. The image processing method of claim 1, further comprising outputting the scanned document that includes the symbols in a form converted into the preset color or form.

8. An image forming apparatus, comprising:
   a scanner to scan a document;
   a detector to separate a text region from the scanned document and extract symbols transcribed in the text region, the symbol is one of independent character, number or symbol, or part of the respective characters;
   a calculator to calculate feature values of at least one of brightness, size and thickness of the extracted symbols; and
   a controller to select a representative value from the calculated feature values, and to convert a color or visual form of the extracted symbols having the feature values other than the representative value into a preset color or form.

9. The image forming apparatus of claim 8, wherein the document is a document including color text therein, which undergoes a process of conversion into monochromatic data before being outputted, during which the document loses information about the color text.

10. The image forming apparatus of claim 8, wherein the controller converts the color or visual form of the symbols into the preset color or form that corresponds to the feature values of the symbols.

11. The image forming apparatus of claim 8, wherein the controller selects the feature values of a majority of the symbols as the representative value.

12. The image forming apparatus of claim 8, wherein the controller converts at least one of thickness, font and size of the symbols having the feature values other than the representative value.

13. The image forming apparatus of claim 8, further comprising a user interface to receive an input of target color or form for conversion, according to the feature values of the symbols.

14. The image forming apparatus of claim 8, further comprising an image former configured to output the scanned document that includes the symbols in a form converted into the preset color or form.

15. At least one non-transitory computer-readable recording medium storing computer readable instructions that when executed implement an image processing method comprising:
   scanning a document;
   separating a text region from the scanned document;
   extracting symbols transcribed in the text region, the symbol is one of independent character, number or symbol, or part of the respective characters;
   calculating feature values of at least one of brightness, size and thickness of the extracted symbols;
   selecting a representative value from the calculated feature values; and
   converting a color or visual form of the extracted symbols having the feature values other than the representative value into a preset color or form.

* * * * *